J. POLLEY & G. GABRIELSEN.
UPFLOW STRAINER.
APPLICATION FILED MAR. 15, 1917.

1,278,809.

Patented Sept. 10, 1918.

Witnesses:

John Polley and
Gustao Gabrielsen, Inventors,
By _____ Atty.

UNITED STATES PATENT OFFICE.

JOHN POLLEY AND GUSTAV GABRIELSEN, OF PORTLAND, OREGON.

UPFLOW STRAINER.

1,278,809.

Specification of Letters Patent. Patented Sept. 10, 1918.

Application filed March 15, 1917. Serial No. 154,974.

*To all whom it may concern:*

Be it known that we, JOHN POLLEY and GUSTAV GABRIELSEN, citizens of the United States, residing in the city of Portland, county of Multnomah, and State of Oregon, have invented certain new and useful Improvements in Upflow Strainers, of which the following is a specification.

Our invention relates to upflow strainers, and more particularly to an upflow strainer attached to a receptacle, which can be set into the top of a milk can, with the strainer portion extended down into the can, or which can be set into a pan or other larger container, and the milk poured into the receptacle portion thereof, and be strained as it flows upwardly and out over the top of the strainer portion, our improved device being so constructed that it can be easily taken apart and thoroughly cleaned. It is so arranged that a part thereof constitutes a settling chamber into which sediment and other dirt can settle and from which it can be removed very easily.

In order to illustrate our invention and to better describe it, we have shown one practical embodiment thereof in the accompanying sheet of drawings in which,—

Figure 1:
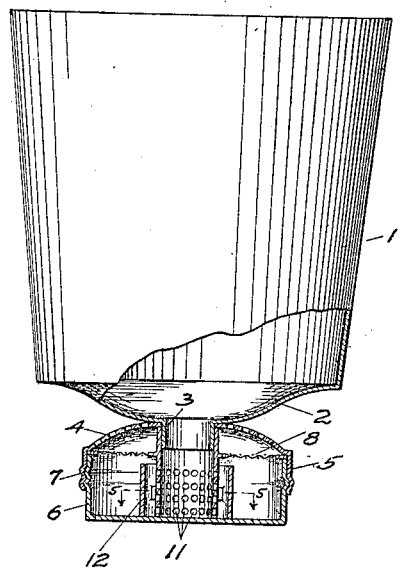
Figure 1 is a side elevation of a receptacle with upflow strainer embodying our invention, with the strainer portion thereof shown in section.
Figure 2:
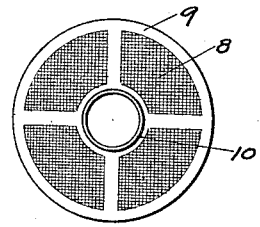
Fig. 2 is a top plan view of a wire strainer disk having a central tubular part.
Figure 5:
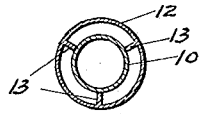
Fig. 5 is a cross sectional view taken on line 5—5 of Fig. 1.
Figure 4:
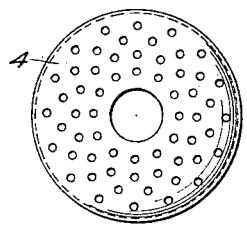
Fig. 4 is a top plan view of the convexed perforated top portion of the strainer.
Figure 3:
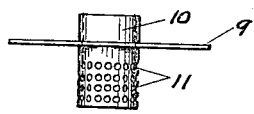
Fig. 3 is a side elevation thereof.

Referring now more in detail to the drawings, 1 designates a receptacle into which the milk or other liquid to be strained is poured, said receptacle having a dished bottom, as at 2, provided with a central, downwardly depending tubular discharge member 3. 4 designates a perforated strainer top, having a flange, or side, 5, provided with threads and adapted to receive a bottom part 6, which is inserted thereinto and has a threaded engagement therewith, as at 7. The strainer wire 8, is mounted in a ring-like member 9, having a central tubular member 10, perforated around its lower portion, as at 11, said tubular member 10, being adapted to be inserted over the short tubular member 3, as shown in Fig. 1, with the ring 9, of said strainer clamped between the perforated strainer top 4, and the upper edge of the bottom part 6, as clearly shown in Fig. 1. Placed around the lower portion of the tubular member 10, and resting upon the bottom of the bottom part 6, is a collar-like member 12, provided with spacing lugs, as 13, by means of which said collar is centered around the lower portion of said tubular member 10.

It will thus be seen that all of the parts of our improved upflow strainer can be very easily and quickly removed, and there are no parts which cannot be thoroughly cleaned with ease.

The operation of our improvement may be briefly described as follows:

The milk is poured into the receptacle 1, and flows down through the tubular discharge member 3, and into the tubular member 10, and out through the perforations 11 thereof, into the annular space between the collar 12, and said tubular member 10, from whence it passes up over the top of said collar 12, and into the bottom part 6, until said bottom 6 is filled, the milk then being evenly and uniformly forced upwardly through the strainer wire 8, and out through the perforated top 4. By providing the collar 12, the main body of the milk in the bottom part 6, is not agitated sufficiently but what any sediment or dirt in the milk will settle thereinto, and be easily removed therefrom by simply removing the bottom part 6.

We are aware that slight changes can be made in the details of our invention without departing from the spirit thereof, and we do not, therefore, limit the invention to this particular embodiment thereof, except as we may be limited by the hereto appended claims.

We claim:

1. An upflow strainer of the character referred to, comprising a receptacle, a perforated tubular member connected therewith, a strainer wire around said tubular member above its perforations, a collar-like member around said perforated tubular member below said strainer wire, and spaced therefrom, and a strainer body having a perforated top and inclosing said perforated tubular member, collar and strainer wire, substantially as described.

2. An upflow strainer of the character referred to, comprising in combination a receptacle, a perforated tubular member into which said receptacle discharges, a collar surrounding said perforated tubular member at a space therefrom, a strainer around said tubular member above said collar, and a strainer body detachably connected to said receptacle, and inclosing said perforated tubular member, strainer and collar, substantially as described.

3. An upflow strainer of the character referred to comprising in combination a receptacle, a strainer body detachably connected to the bottom of said receptacle, and comprising a perforated top and a detachable bottom, a perforated tubular member arranged centrally therein and communicating with said receptacle, and a strainer wire therein around said perforated tubular member above the perforations therein.

4. An upflow strainer of the character referred to comprising in combination a receptacle, a strainer body detachably connected to the bottom of said receptacle, and comprising a perforated top and a detachable bottom, a perforated tubular member arranged centrally therein and communicating with said receptacle, a detachable strainer wire therein around said perforated tubular member above the perforations therein, and a detachable collar surrounding said perforated tubular member at a space therefrom and below said strainer wire, substantially as described.

Signed at Portland, Multnomah county, Oregon, this 8th day of March, 1917.

JOHN POLLEY.
GUSTAV GABRIELSEN.

In presence of—
I. M. GRIFFIN,
J. C. STRENG.

Copies of this patent may be obtained for five cents each, by addressing the "Commissioner of Patents, Washington, D. C."